US006871901B2

(12) United States Patent
Stenvers et al.

(10) Patent No.: US 6,871,901 B2
(45) Date of Patent: Mar. 29, 2005

(54) CABRIOLET MOTOR VEHICLE WITH FOLDABLE HARDTOP

(75) Inventors: Jürgen Stenvers, Munich (DE); Michael Respondek, Munich (DE); Thomas Dintner, Fuerstenfeldbruck (DE); Kozo Ohdoi, Hiroshima (JP)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 10/361,019

(22) Filed: Feb. 10, 2003

(65) Prior Publication Data

US 2003/0218355 A1 Nov. 27, 2003

(30) Foreign Application Priority Data

Feb. 8, 2002 (DE) ........................................ 102 05 342

(51) Int. Cl.[7] .................................................. B60J 7/00

(52) U.S. Cl. .................................. 296/108; 296/107.17

(58) Field of Search ........................... 296/108, 107.07, 296/107.17, 107.08, 146.14, 107.18, 107.2, 121, 180.1

(56) References Cited

U.S. PATENT DOCUMENTS 6,053,560 A * 4/2000 Rothe ......................... 296/108
6,086,136 A * 7/2000 Jambor et al. ......... 296/107.17
6,123,381 A 9/2000 Schenk
6,131,988 A * 10/2000 Queveau et al. ............ 296/108
6,217,104 B1 * 4/2001 Neubrand ................... 296/108
6,312,042 B1 11/2001 Halbweiss et al.
6,336,673 B1 * 1/2002 Rothe et al. ................ 296/108
6,382,703 B1 * 5/2002 Queveau et al. ............ 296/108
6,572,175 B2 * 6/2003 Schutt et al. ............... 296/108
6,585,310 B1 * 7/2003 Guillez et al. .............. 296/108
6,592,169 B2 * 7/2003 Obendiek ................... 296/108
6,604,775 B2 * 8/2003 Obendiek ................... 296/108
6,666,495 B2 * 12/2003 Nania ......................... 296/108
2002/0185886 A1 * 12/2002 Obendiek ................... 296/108
2003/0085587 A1 * 5/2003 Reinsch ................. 296/107.17
2003/0201658 A1 * 10/2003 Obendiek et al. ........... 296/108
2003/0218355 A1 * 11/2003 Stenvers et al. ............ 296/108
2004/0012223 A1 * 1/2004 Guillez et al. .............. 296/108

FOREIGN PATENT DOCUMENTS

DE 196 35 537 C1 1/1998
DE 196 39 504 A1 4/1998
DE 196 42 154 A1 4/1998
DE 196 49 751 A1 6/1998
DE 199 34 673 * 7/1999
DE 199 30 616 C1 9/2000
DE 199 59 317 C1 1/2001
DE 199 62 070 A1 7/2001
DE 101 46 266 * 9/2001
DE 102 29 808 * 11/2003
EP 0 835 778 * 8/1997
JP 2003 159946 * 6/2003

* cited by examiner

*Primary Examiner*—Kiran Patel
(74) *Attorney, Agent, or Firm*—Nixon Peabody LLP; David S. Safran

(57) ABSTRACT

In a cabriolet motor vehicle (10) with a foldable roof, especially a foldable hardtop (12), with a rigid rear window (18) which is movable between a closed position in which it covers the vehicle interior, and a stowage position in which it is held in the stowage space (54) in the vehicle (10), the hardtop (12) has a front roof part (14) which can be connected to a transverse roof support (20) which borders the windshield and a rear roof part (16) which can be moved relative to it and which is coupled to it. Furthermore, the rear window (18) is made on a rear window element (18) which can be moved relative to the vehicle body and relative to the rear roof part (16).

15 Claims, 7 Drawing Sheets

20 14 19 34 12 10 16 48 32 43 18 44 46 22 24 26 36 38 28 30 40 50 42 52

CABRIOLET MOTOR VEHICLE WITH FOLDABLE HARDTOP

BACKGROUND OF THE INVENTION

1. Field of the Invention

The invention relates to a cabriolet motor vehicle with a foldable roof, especially a foldable hardtop with a rigid rear window, which is displaceable between a closed position in which it covers the vehicle interior, and a stowage position in which it is held in the stowage compartment of the vehicle, the foldable roof comprising a front roof part which can be connected to a transverse roof support which borders the windshield, and a rear roof part which can be moved relative to it and which is coupled to it.

2. Description of the Related Art

A vehicle generally of the initially mentioned type is known from German Patent DE 199 30 616 C1 and corresponding U.S. Pat. No. 6,312,042. In this known vehicle, the foldable hardtop comprises a front roof part and a rear roof part which is connected to the front roof part, and into which a rigid rear window is permanently inserted. The rear roof part is coupled to the vehicle body to be able to swing around an axis which runs in the transverse direction of the vehicle at the front of the rear end area of the vehicle and near the body in the closed position. Additionally, a second guide journal provided on the rear of the vehicle by which the rear roof part is guided to be able to move and turn in a guideway.

The front and the rear roof parts are connected to one another via a four-bar mechanism, lever drive such that the front roof part can be pushed relative to the rear one without changing its relative angular position relative to the rear roof part, the front roof part moving to under the rear roof part.

Furthermore, published German Patent Application DE 196 42 154 A1 discloses a cabriolet vehicle with a foldable, three-part hardtop. In this vehicle, between the front roof part and the rear roof part into which a rigid rear window is permanently inserted, there is a middle roof part which is connected to the front roof part via a hinge and to the rear roof part via a parallelogram connecting rod lever drive.

The disadvantage in the known versions is that the foldable roofs shown there require both a large stowage volume in the stowage position and also a large travel volume when the roof is moved between the closed position and the stowage position.

SUMMARY OF THE INVENTION

The primary object of the present invention is to devise a motor vehicle of the initially mentioned type in which the foldable roof requires a smaller travel volume and a smaller stowage volume in its stowage position.

The invention is based on the generic prior art in that the rear window is made on a rear window element which can be moved relative to the vehicle body and relative to the rear roof part.

The vehicle body here is defined in this application as the body of the vehicle without the roof structure.

In most modern vehicles, the rear window has a relative large curvature in the transverse direction of the vehicle. In addition, the rear window, for reasons of aerodynamics, is generally located inclined toward the front of the vehicle. This leads to the rear window, in the area of the transverse vehicle middle, having a much greater dimension in the lengthwise direction of the vehicle than in the areas near the vehicle sides. When the rear roof part, as is conventional, is swung around an axis which runs in the transverse direction of the vehicle which from the closed position into the stowage space which is located behind the seats of the vehicle, the greater lengthwise dimension of the rear roof part in the area of the transverse vehicle center leads to the required large stowage volume.

Because the rear window in accordance with the invention is made on a rear window element which is separate from the rear roof part and which can move relative to it, when moving from the closed position into the stowage position, this rear window element can first be moved a distance out of the closed position into the vehicle interior, by which the total length of the second roof element (measured in the closed position in the lengthwise direction of the vehicle) is clearly shortened. In other words, the rear roof element and the rear window element can be pushed together in the lengthwise direction of the vehicle and thus shortened in their overall dimensions.

Since this invention can be used especially advantageously on foldable hardtops, i.e., for roofs with at least one rigid section of the outside roof skin, preferred developments of the invention are explained below using the example of such a hardtop. However, it is expressly pointed out that this invention can also be used for roofs with an outside skin which is flexible at least in sections, such as, for example, fabric roofs.

Especially simple and advantageous kinematics arise for the rear window element when it is coupled on its side edges which to a respective rear window element rotary connecting rod which is coupled to the vehicle body.

As usual, the rear roof part is made such that the rear roof part has two roof members which are each connected on a lengthwise end to a respective side of the vehicle to be able to move relative to the latter and which are connected on their other lengthwise end to one another by a roof element which runs essentially in the transverse direction of the vehicle. In this case, the rear window element, in the closed position, can be encompassed and sealed laterally by the roof members and to the top by the roof element. The roof members, designated in this way, in the closed position of the roof, correspond essentially to the C columns in closed passenger cars.

According to one aspect of the invention, the edge area of the rear roof part which interacts in the closed position with the rear window element, and/or the edge area of the rear window element which interacts with the rear roof part, can be provided with scaling elements so that the gap which has formed between the rear window element and the rear roof part is sealed in the closed position.

Especially simple kinematics can be achieved for the hardtop by the rear roof part being connected to the vehicle body to be able to swing around a axis which runs essentially in the transverse direction of the vehicle. This swinging motion of the rear roof part can then be carried out with especially little space consumption if the coupling point of the rear roof part on the vehicle body lies in the area of the lengthwise ends of the roof members, which ends are connected to the vehicle body, and which area is near the front of the vehicle.

For frictionless movement of the hardtop between the closed position and the stowage position, a coordinated sequence of motions of the individual roof parts and of the rear window element relative to one another can be of great importance. This coordination can be achieved, or at least supported, by the rear roof part being connected to the rear window element via a rear window element connecting rod which is coupled both to the rear roof part and also to the rear window element. In this case, it is possible to transfer the motion from the rear roof part to the rear window element or vice versa, as a result of the coupling of the rear window element connecting rod to both the rear roof part and also to the rear window element, a certain latitude being preserved for individual guidance of the indicated hardtop components.

For clarification, within the framework of this application, the expression "coupled to an object" is a synonym for "connected to an object to be able to turn or pivot relative to it." If not otherwise stated, rotation around an axis of rotation which runs essentially in the transverse direction of the vehicle is meant.

In order to produce the required motion of the rear window element, the hardtop can be made such that the rear window element is connected to the vehicle body to be able to move along a guide arrangement.

For greater freedom in the structural configuration and accommodation of the guide arrangement on the vehicle, it is advantageous for the rear window element to be rigidly connected to the rear window element guide rod which is movably guided in the guide arrangement.

For better coordination of the sequence of motions of the hardtop components among one another and for transfer of motion between the front and rear roof part, the hardtop can be configured such that there is a roof part connecting rod which connects the rear roof part to the front roof part and which is coupled to the front roof part and is connected to the rear roof part to be able to move relative to it.

The front and the rear roof part, in addition to the roof part connecting rod which joins them, can be connected on their edge areas which face toward one another via a joint which allows rotation of the roof parts relative to one another around an axis of rotation which runs essentially in the transverse direction of the vehicle. This can result in that the front roof part, when the hardtop is being moved at least in the area near the closed position, preferably over the entire range of motion, essentially not changing its angular position with respect to the vehicle. In this way, the travel space required by the hardtop can be further reduced.

Alternatively, the joint can be made as a connecting rod gear connection which connects the front and the rear roof part.

Relative motion provided with these or also other boundary conditions between the front and the rear roof part can be possible in that the roof part connecting rod for connecting to the rear roof part is coupled to an compensation connecting rod which is coupled to the rear roof part.

Basically, on the vehicle and/or on the rear window element there can be a seal which provides for sealing of the gap which forms between the vehicle body and the rear window element in the closed position. However, under certain circumstances, this seal, which should not be damaged when the rear window element is moving, limits the freedom of motion of the rear window element. This limitation can be avoided by a seal carrier being coupled to the rear roof part and sealing the edge area of the rear window element which face toward the vehicle body in the closed position of the hardtop, at least in sections. Such a seal carrier can thus be quickly moved by suitable kinematics out of its sealed position when the hardtop is moved and thus can clear the path of motion for the rear window element.

Simple and economical, but still reliable guidance of the seal carrier when the hardtop is moved can take place by the seal carrier being guided resting on a body-mounted slideway, at least along a section of its path of motion when the hardtop is moved from the closed position into the stowage position.

To close the hardtop, the front roof part can be attached to the transverse roof support or the apron, for example, manually, electrically, hydraulically, pneumatically or the like. Similar attachment or locking possibilities (for example, locking in the down position) are possible for the other roof components.

To enhance the sealing action, the seal carrier can interact with the rear window element guide rod such that the latter in the closed position presses against the vehicle body and/or the rear window element, preferably against its frame. The rear window element guide rod can be made wedge-like for this purpose.

The hardtop can be moved manually between the closed position and the stowage position, and advantageously, the front roof part can be used by the operator as a grip part. However, in many cases customers now expect that the convertible top or hardtop of a cabriolet need not be moved by hand. For semiautomatic or preferably fully automatic movement, there can be an electrical, hydraulic or pneumatic drive. The drive can, as also with manual operation, be supported by the force of a spring, especially a pneumatic spring, to reduce the required displacement force. The drive can act directly, for example, i.e., without transmission means, on the rear roof part, for example, via a corresponding pivot. On the other hand, due to limited installation space in the vehicle, the designer is not free to choose the attachment site for a drive, so that transmission means between the drive and one of the hardtop components can be necessary. The transmission of force between the drive and hardtop can take place, for example, by the rear roof part being connected to a drive lever which can be turned around the axis of rotation essentially parallel to the pivot axis of the rear roof part. The drive lever, itself, can then be connected to the drive so that torque can be transmitted to the components of the hardtop.

Compensation of the offset of the pivot axis of the rear roof part and the axis of rotation of the drive lever can take place by the drive crank being coupled to a compensation rod which, in turn, is coupled to the rear roof part.

Here, the number of components can be reduced by the compensation rod being used as a compensation rod of the roof part connecting rod.

In order to relieve the rear roof element of force transmission between the various connecting rods which may be coupled to it and which connect the roof elements to one another and/or the rear roof element and the rear window element, the hardtop can be made such that the rear roof part, preferably on the lengthwise ends of the roof members, which ends are coupled to the vehicle, is connected rigidly to the roof part guide rod to which all the connecting rods which are directly coupled to the rear roof part, including the compensation disk, are coupled.

It is expressly pointed out that, in the above described configuration of the hardtop, a single drive for moving the hardtop between the closed position and the stowage position is sufficient.

The invention is explained in detail below with reference to the attached drawings using preferred embodiments.

DETAILED DESCRIPTION OF THE INVENTION

Figure 1:
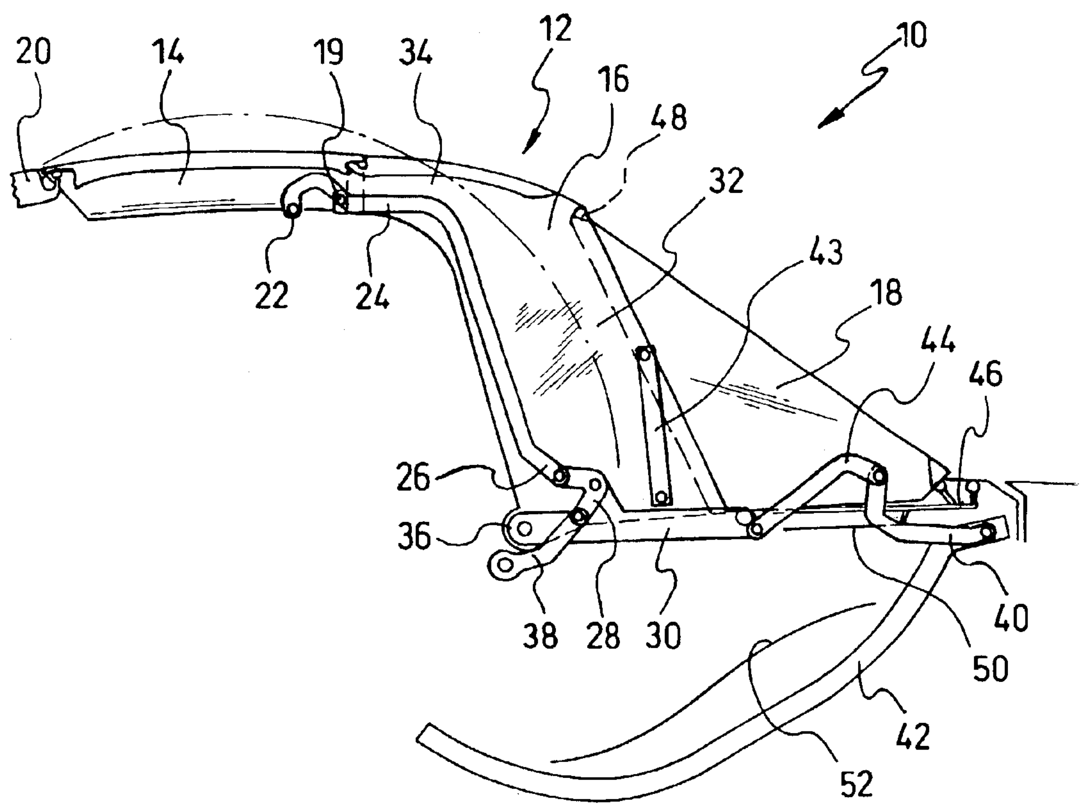
FIG. 1 is a schematic cross-sectional view of the roof area of a cabriolet vehicle in accordance with the invention with the hardtop in the closed position, FIGS. 2 to 6 each show intermediate positions of the hardtop of FIG. 1 during movement from the closed position into the stowage position.

FIG. 1 shows the hardtop 12 on the motor vehicle 10 in the closed position. The hardtop comprises a front roof part 14, a rear roof part 16 and a rear window element 18. The front roof part 14 and the rear roof part 16, are among others, connected via a pivot 19 to swing relative to one another around an axis of rotation which runs essentially in the transverse direction of the vehicle.

The front roof part 14, in the closed position shown in FIG. 1, rests with its forward edge (the edge in front in the forward direction of travel) on the transverse roof support 20. The transverse roof support 20 is part of the border of a windshield (not shown).

The roof part connecting rod 24 is coupled to the front roof part 14 at one end 22. With its other end 26, the roof part connecting rod 24 is coupled on one end of the leg of a V-shaped compensation rod 28. The V-shaped compensation rod 28 is coupled by the tip where the two V-legs meet to a roof part guide rod 30 which is rigidly connected to the rear roof part 16.

The rear roof part 16 comprises two roof members 32 which are essentially parallel to one another (only one is shown) and a roof element 34 which connects the roof members 32 and which runs essentially in the transverse direction of the vehicle (i.e., orthogonally to the plane of the drawings of FIG. 1). The roof part guide connecting rod 30 is located on the lengthwise end of the roof member 32, which end is near the roof element, and is coupled to the vehicle body on its end area 36 near the front of the vehicle to be able to pivot around a pivot axis which runs in the transverse direction of the vehicle.

A drive lever 38 is coupled to the end of the other leg of the compensation rod 28. The drive lever 38 is connected to a vehicle-mounted drive (not shown) to be able to turn around an axis of rotation which runs in the transverse direction of the vehicle.

The rear window element 18 has a rear window element guide rod 40 which is rigidly connected to it and which is movably located in a guide rail 42. Furthermore, the rear window element 18 is coupled to the rear window element rotary connecting rod 43 on its edge areas which are the side areas in the transverse direction of the vehicle, roughly in the region of the vertical middle (viewed in the closed position); this rotary connecting rod is, in turn, attached to the vehicle body to be able to turn around an axis of rotation which runs essentially in the transverse direction of the vehicle. A rear window element connecting rod 44 is coupled at one end to the rear window element guide rod 40 and at its other end to the roof part guide rod 30 of the rear roof part 16, and thus, connects the rear roof part 16 to the rear window element 18. The rear window element 18 is sealed, in the closed position, relative to the body of the vehicle 10 by a seal carrier 46 which is coupled to the roof part guide rod 30. To seal the rear window element relative to the rear roof part, there is a seal 48 on the peripheral edge of the rear window element.

The seal carrier 46, on its bottom, has a support 50 with which it travels to rest on a slideway 52 when the hardtop is moved into the stowage position and is guided resting on the guideway.

Figure 2:
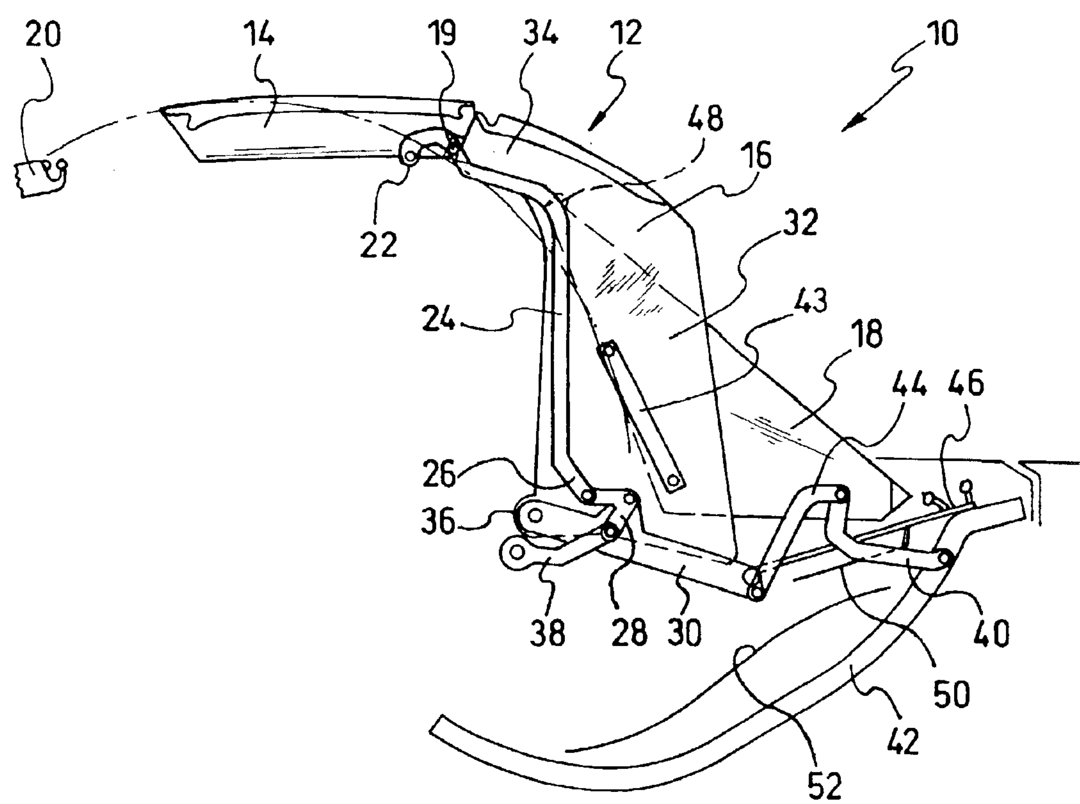
Figure 3:
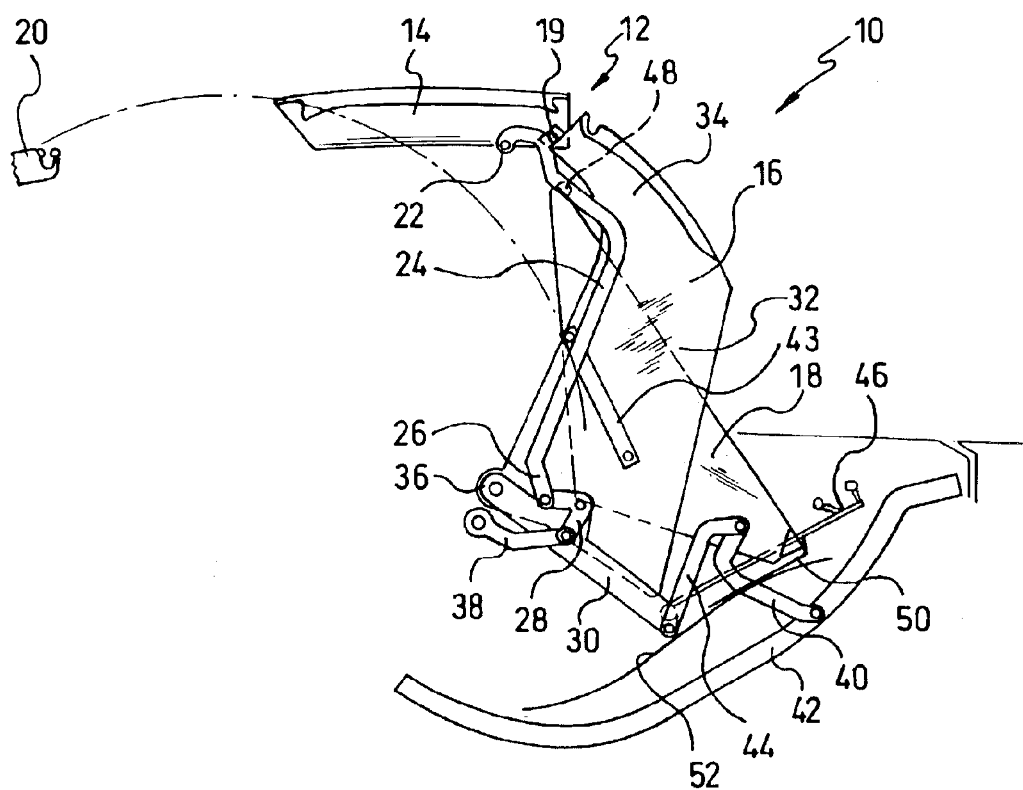
Figure 4:
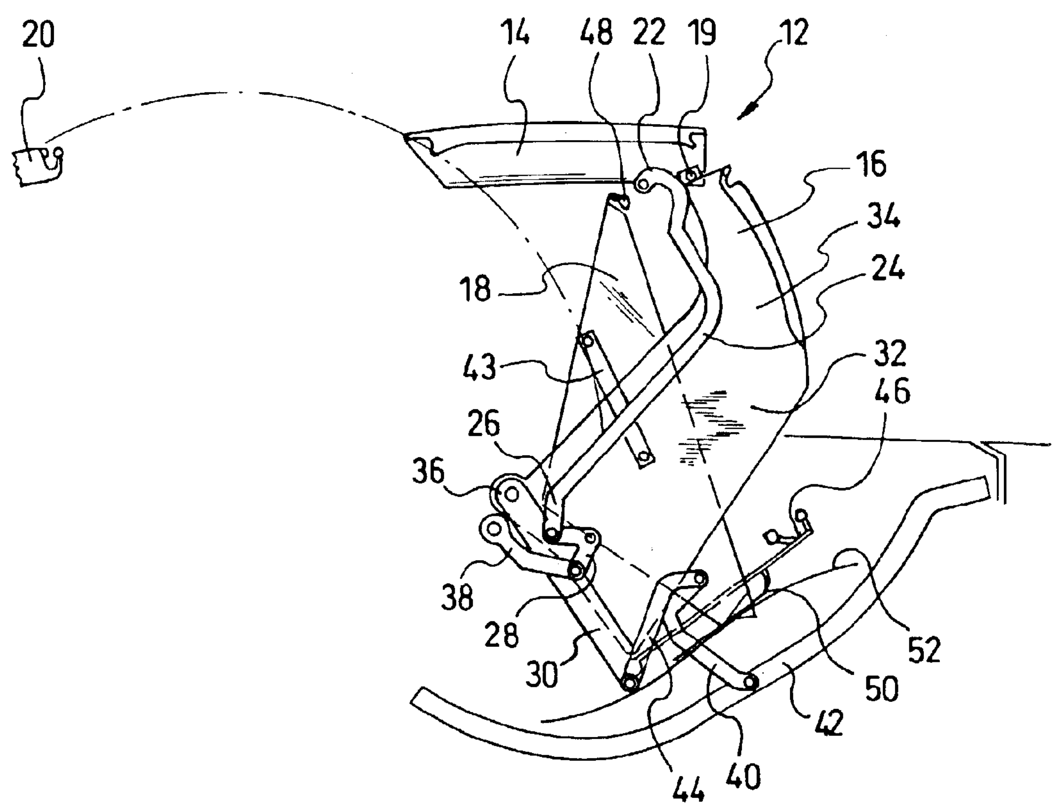
Figure 5:
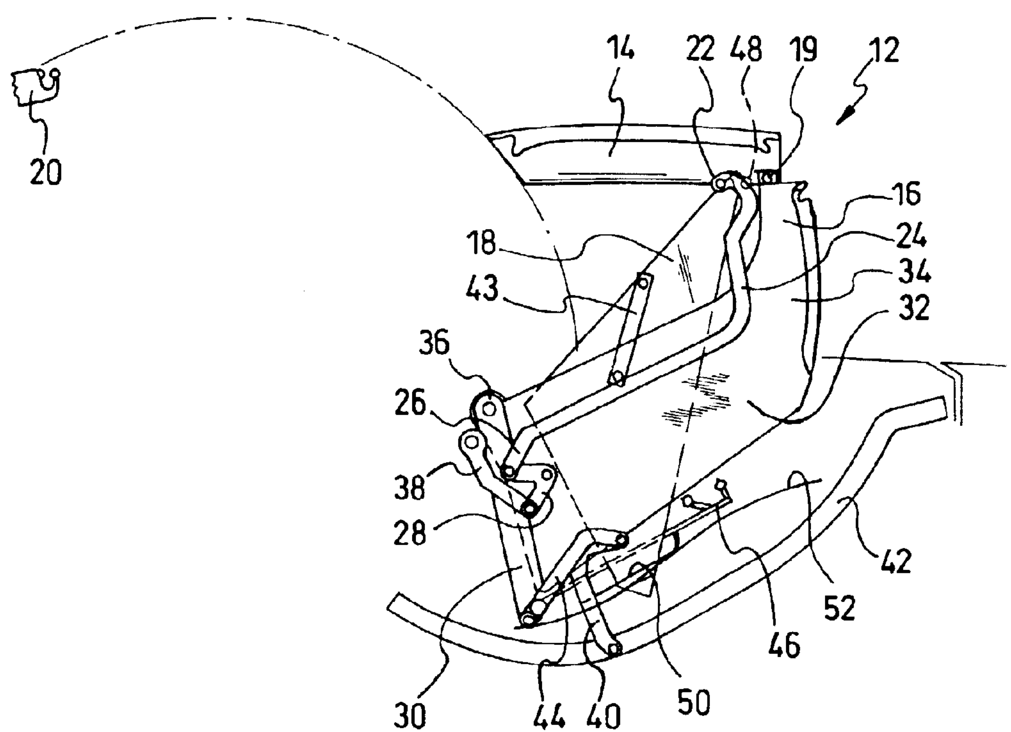
Figure 6:
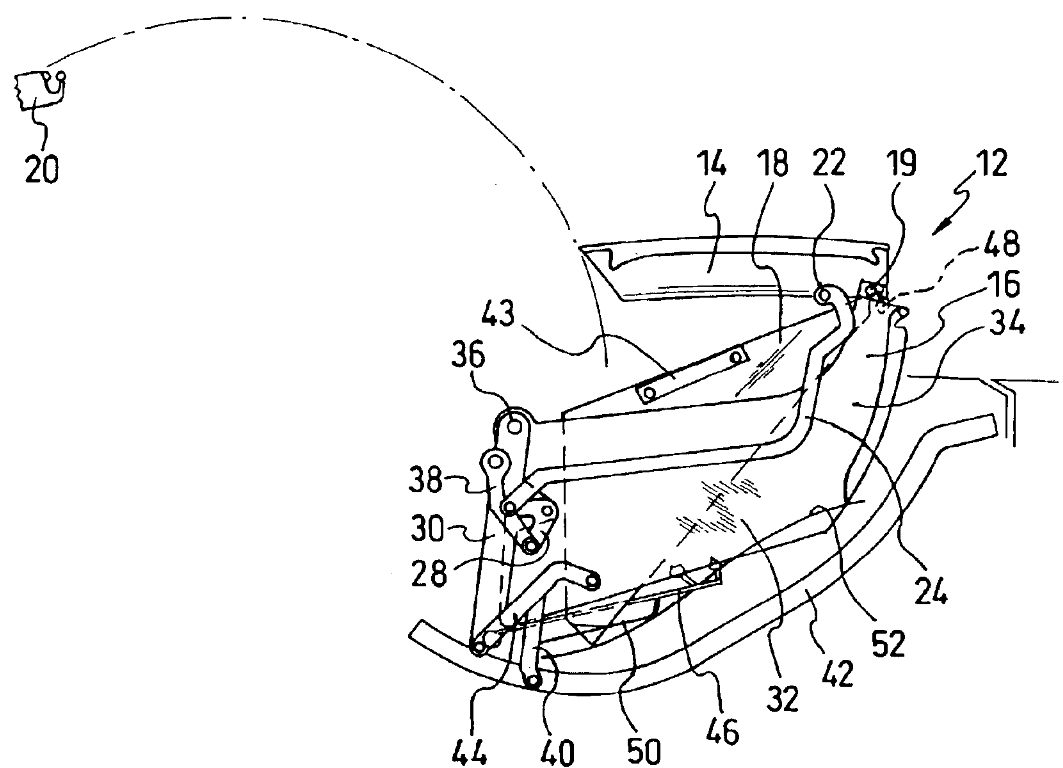

FIG. 2 shows the hardtop 12 moved out of its closed position, a distance in the direction of the stowage position.

It is apparent that the front roof part 14 essentially does not change its angular orientation with respect to the vehicle 10. The front and the rear roof part 14, 16 can be connected on their facing edges, also via a lever drive, for example, a four-bar mechanism, instead of the pivot 19.

Figure 7:
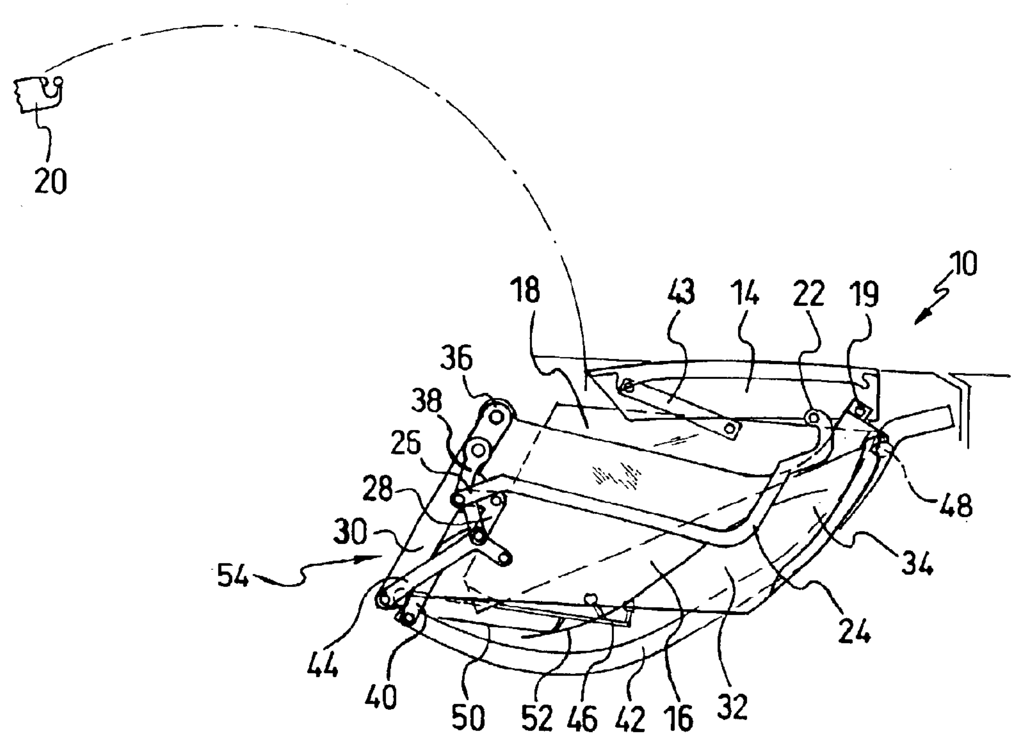
FIG. 7 is a schematic cross-sectional view of the roof area of a cabriolet vehicle in accordance with the invention with the hardtop in the stowage position.

FIGS. 3 to 6 show other intermediate positions of the hardtop shown in FIGS. 1 & 2 which lie increasingly near the stowage position. FIG. 7 finally shows the hardtop in the stowage position within a stowage space 54. The stowage space 54 is closed in preferred embodiments in the stowage position by the front roof part 14, and in the closed position, by the rear window element 18 and the seal carrier 46, so that a separate convertible top hatch is not required.

It is apparent, in the intermediate positions and in the end position, how the rear window element 18 is moved in its displacement along the guideway arrangement 42, a distance into the vehicle interior so that it is then surrounded by the rear roof part 16 on three sides (see FIGS. 3 to 7).

It is pointed out that FIGS. 1 to 7 only schematically reproduce the motion of the individual roof elements relative to one another. FIGS. 1 to 7, in particular, are not conformal to one another.

Furthermore, in some embodiments, in the rear, a separate side window is not necessary; this is beneficial both with respect to cost and also weight.

The features of the invention disclosed in the specification above, in the drawings and in the claims can be important both individually and also in any combination for the implementation of the invention.

What is claimed is:

1. Cabriolet motor vehicle, comprising:

a vehicle body a foldable hardtop roof, said roof being movable between a closed position in which it covers a vehicle interior, and a stowage position in which it is held in a stowage space in the vehicle body, said foldable roof comprising:

a front roof part which is connectable to a transverse roof support which borders the windshield, and a rear roof part which is movable relative to the front roof part and which is coupled to the front roof part, a rigid rear window on a rear window element which is movable relative to the rear roof part and the vehicle body, wherein the rear window element, when moving from the closed position into the stowage position, is first moved a distance out of the closed position into the vehicle interior.

2. Cabriolet motor vehicle as claimed in claim 1, wherein the rear roof part has two roof members which are each connected on at a first lengthwise end to a respective side of the vehicle body to move relative to the vehicle body, the roof members being connected to each other at a second lengthwise end by a roof element which runs essentially in a transverse direction of the vehicle body.

3. Cabriolet motor vehicle as claimed in claim 1, wherein the rear roof part is pivotably connected to the vehicle body to pivot around a pivot axis which runs essentially in a transverse direction of the vehicle body.

4. Cabriolet motor vehicle as claimed in claim 2, wherein the rear roof part is pivotably connected to the vehicle body to pivot around a pivot axis which runs essentially in a transverse direction of the vehicle body, and wherein a connection point of the rear roof part to the vehicle body lies in an area of the first lengthwise ends of the roof members, which area is near the front of the vehicle.

5. Cabriolet motor vehicle as claimed in claim 1, wherein the rear roof part is connected to the rear window element via a rear window element connecting rod which is coupled both to the rear roof part and also to the rear window element.

6. Cabriolet motor vehicle as claimed in claim 1, wherein the rear window element is connected to the vehicle body so as to be movable along a guide arrangement.

7. Cabriolet motor vehicle as claimed in claim 6, wherein the rear window element is rigidly connected to a rear window element guide rod which is movably guided in the guide arrangement.

8. Cabriolet motor vehicle as claimed in claim 1, wherein a roof part connecting rod connects the rear roof part to the front roof part, the roof part connecting rod being coupled to the front roof part and to the rear roof part so as to be able to move relative thereto.

9. Cabriolet motor vehicle as claimed in claim 8, wherein the roof part connecting rod is coupled to the rear roof part by a compensation rod which is coupled to the rear roof part.

10. Cabriolet motor vehicle as claimed in claim 1, wherein a seal carrier is coupled to the rear roof part and seals an edge area of the rear window element relative the vehicle body at least in sections which face toward the vehicle body in the closed position of the hardtop.

11. Cabriolet motor vehicle as claimed in claim 10, wherein the seal carrier is guided resting on a body-mounted slideway, at least along a section of its path of motion when the hardtop is moved from the closed position into the stowage position.

12. Cabriolet motor vehicle as claimed in claim 1, wherein the rear roof part is connected to a drive lever which is rotatable around an axis of rotation which is essentially parallel to a pivot axis of the rear roof part.

13. Cabriolet motor vehicle as claimed in claim 12, wherein a roof part connecting rod connects the rear roof part to the front roof part, the roof part connecting rod being coupled to the front roof part and to the rear roof part so as to be able to move relative thereto; wherein the roof part connecting rod is coupled to the rear roof part by a compensation rod which is coupled to the rear roof part; and wherein a drive lever is coupled to the compensation rod which, in turn, is coupled to the rear roof part.

14. Cabriolet motor vehicle as claimed in claim 13, wherein the compensation rod is of the roof part connecting rod provides compensation for an offset of the pivot axis of the rear roof part and the axis of rotation of the drive lever.

15. Cabriolet motor vehicle as claimed in claim 13, wherein the rear roof part, on the lengthwise ends of the roof members which are coupled to the vehicle body, is connected rigidly to a roof part guide rod to which all connecting rods which are directly coupled to the rear roof part, including the compensation rod, are coupled.

* * * * *